United States Patent
Kang et al.

(10) Patent No.: US 8,074,500 B2
(45) Date of Patent: Dec. 13, 2011

(54) METHOD OF CALCULATING CARBON DIOXIDE EMISSION OF STEAM TURBINE CHP PLANT AND SYSTEM FOR THE METHOD

(75) Inventors: Seok Hun Kang, Daejeon (KR); Dae Hun Chung, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 120 days.

(21) Appl. No.: 12/544,611

(22) Filed: Aug. 20, 2009

(65) Prior Publication Data

US 2010/0217637 A1   Aug. 26, 2010

(30) Foreign Application Priority Data

Feb. 23, 2009 (KR) .......................... 10-2009-0014819

(51) Int. Cl.
*G06Q 10/00* (2006.01)
(52) U.S. Cl. ..................................... 73/112.02
(58) Field of Classification Search ............... 73/112.02
See application file for complete search history.

(56) References Cited

U.S. PATENT DOCUMENTS

| | | | |
|---|---|---|---|
| 6,912,889 B2 * | 7/2005 | Staphanos et al. | 73/23.31 |
| 6,983,640 B1 * | 1/2006 | Staphanos et al. | 73/23.31 |
| 7,021,126 B1 * | 4/2006 | Badami et al. | 73/112.03 |
| 7,421,348 B2 * | 9/2008 | Swanson | 702/32 |
| 7,693,725 B2 * | 4/2010 | Trout et al. | 705/317 |
| 2006/0020502 A1 * | 1/2006 | Trout et al. | 705/9 |
| 2007/0225836 A1 * | 9/2007 | Swanson | 700/45 |
| 2009/0070047 A1 * | 3/2009 | Swanson | 702/32 |
| 2010/0281878 A1 * | 11/2010 | Wormser | 60/781 |
| 2010/0312490 A1 * | 12/2010 | Dooley | 702/24 |

FOREIGN PATENT DOCUMENTS

| | | |
|---|---|---|
| JP | 2007-052530 A | 3/2007 |
| JP | 2007-265008 A | 10/2007 |
| KR | 20-1999-0031667 U | 7/1999 |
| KR | 10-2008-0074753 A | 8/2008 |

OTHER PUBLICATIONS

KIPO Notice of Allowance for Korean Application No. 10-2009-0014819.

* cited by examiner

*Primary Examiner* — Freddie Kirkland, III
(74) *Attorney, Agent, or Firm* — LRK Patent Law Firm

(57) ABSTRACT

The present invention relates to a method and a system for calculating carbon dioxide emission of a steam turbine CHP plant, and according to the method of calculating carbon dioxide emission of the present invention, the total fuel emission of a plant is calculated. The total greenhouse gas emission is calculated from the total fuel consumption. System thermal efficiency is calculated from the total fuel consumption. Fuel consumption for thermal generation is calculated from the system thermal efficiency. Fuel consumption for power generation is calculated from the system thermal efficiency. Power generation efficiency is calculated from the fuel consumption for power generation. The total carbon dioxide emission in thermal generation is calculated from the fuel consumption for thermal generation. The total carbon dioxide emission in power generation is calculated from the fuel consumption for power generation. According to the method of calculating carbon dioxide emission of the present invention described above, it is possible to separately obtain carbon dioxide emission when generating heat and electricity.

16 Claims, 2 Drawing Sheets

METHOD OF CALCULATING CARBON DIOXIDE EMISSION OF STEAM TURBINE CHP PLANT AND SYSTEM FOR THE METHOD

BACKGROUND OF THE INVENTION

1. Field of the Invention

The present invention relates to a method of calculating carbon dioxide emission of a steam turbine CHP plant and a system for the method. In detail, the present invention relates to a method of calculating carbon dioxide emission that makes it possible to separately calculate carbon dioxides discharged when heat and electricity are generated in a steam turbine CHP plant that simultaneously generates heat and electricity, and a system for the method.

2. Description of Related Art

Recently, interest in global warming has increased and it has been claimed to regulate the greenhouse gas including carbon dioxide, which is a main factor of the global warming.

However, since the United Nations Framework Convention of Climate Change (abb. UNFCCC or FCCC) does not have binding force in reduction of greenhouse gas, in order to substantially reduce the greenhouse gas, developed countries (38 countries), which have a historical responsibility for greenhouse gas emissions through the Industrial Revolution, have adopted Kyoto Protocol including a concrete implement program prescribing average 5.2% reduction to the emissions in 1990 during the first commitment period (2008~2012) in the COP 3 (in Kyoto, Japan, '97), which has been officially effectuated on Feb. 16, 2005, and Korea has ratified it in 2002.

On the other hand, in general, a combined heat power generating system is also called a cogeneration system, which is a system simultaneously generating power and heat from one energy source.

The combined heat power generating system can increase the total thermal efficiency by 70~80% by recovering the heat of discharged gas, which is generated when electricity is generated by operating a gas engine or a turbine, and waste heat of cooling water, and is a high-efficiency method of using energy that is recently recognized as a power and heat source for large buildings, such as an apartment or an office.

Accordingly, it has been considered that carbon dioxide emission should be measured and adjusted in the combined heat power generating system using the high-efficiency method of using energy, under Kyoto Protocol; however, there was a problem in that it was impossible to separately calculate carbon dioxides that are discharged to generate heat and electricity, respectively, in a CHP plant simultaneously generating heat and electricity, by using methods of the related art.

SUMMARY OF THE INVENTION

In order to overcome the problem, it is an object of the present invention to provide a method of calculating carbon dioxide emission that can separately calculating carbon dioxide emissions discharged respectively when heat and electricity are generated in a steam turbine CHP plant that simultaneously generates heat and electricity.

Further, it is another object of the present invention to provide a system for calculating carbon dioxide emission, which performs the method of calculating carbon dioxide emission.

According to an aspect of the present invention to accomplish the objects, the total fuel consumption of the plant is calculated. The total greenhouse gas emission is calculated from the total fuel consumption. System thermal efficiency is calculated from the total fuel consumption. Fuel consumption for thermal generation is calculated from the system thermal efficiency. Fuel consumption for power generation is calculated from the system thermal efficiency. Power generation efficiency is calculated from the fuel consumption for power generation. The total carbon dioxide emission in thermal generation is calculated from the fuel consumption for thermal generation. The total carbon dioxide emission in power generation is calculated from the fuel consumption for power generation.

As an embodiment, the total fuel consumption of the plant is obtained by adding up an input fuel amount, a heat amount received from the outside, and a power amount received from the outside.

As an embodiment, the total greenhouse gas emission is obtained by multiplying the total fuel consumption by an emission factor according to the types of fuels.

As an embodiment, the system thermal efficiency is obtained by dividing a value, which is obtained by subtracting a heat amount consumed in the plant and a power amount consumed in the plant from the total generated heat amount, by the total fuel consumption.

As an embodiment, the fuel consumption for thermal generation is obtained by dividing a sold heat amount by the system thermal efficiency.

As an embodiment, the fuel consumption for power generation is obtained by dividing a value, which is obtained by subtracting a power amount consumed in the plant from the sum of a heat amount consumed in a turbine and a heat amount consumed in a condenser, by the system thermal efficiency.

As an embodiment, the power generation efficiency is obtained by dividing a sold power amount by the fuel consumption for power generation.

As an embodiment, the total carbon dioxide emission in thermal generation is obtained by multiplying the fuel consumption for thermal generation by a carbon dioxide emission factor according to the types of fuels.

As an embodiment, the total carbon dioxide emission in power generation is obtained by multiplying the fuel consumption for power generation by a carbon dioxide emission factor according to the type of fuel.

As an embodiment, the carbon dioxide emission factor in thermal generation is obtained by dividing the total carbon dioxide emission in thermal generation by a sold heat amount.

As an embodiment, the carbon dioxide emission factor in power generation is obtained by dividing the total carbon dioxide emission in power generation by a sold power amount.

According to an aspect of the present invention to accomplish the objects, a system for calculating carbon dioxide emission of a steam turbine CHP plant, includes: a data collecting unit that collects data for calculating carbon dioxide emission; a variable inputting unit that receives variables required for calculating carbon dioxide emission: an emission calculating unit that calculates carbon dioxide emission on the basis of the data collected by the data collecting unit and the variables inputted from the variable inputting unit; and a display unit that displays the result calculated by the emission calculating unit.

As an embodiment, the data includes an input fuel amount, a heat amount received from the outside, a power amount received from the outside, the total generated heat amount, a heat amount consumed in the plant, a power amount consumed in the plant, a sold heat amount, a heat amount consumed in the turbine, a heat amount consumed in the condenser, and a sold power amount.

As an embodiment, the variable includes a carbon dioxide emission factor according to the type of fuel.

As an embodiment, calculating carbon dioxide emission in the emission calculating unit is performed by calculating the total fuel consumption of the plant. The total greenhouse gas emission is calculated from the total fuel consumption. System thermal efficiency is calculated from the total fuel consumption. Fuel consumption for thermal generation is calculated from the system thermal efficiency. Fuel consumption for power generation is calculated from the system thermal efficiency. Power generation efficiency is calculated from the fuel consumption for power generation. The total carbon dioxide emission in thermal generation is calculated from the fuel consumption for thermal generation. The total carbon dioxide emission in power generation is calculated from the fuel consumption for power generation.

As described above, according to a preferred embodiment of the present invention, it is possible to flexibly deal with carbon dioxide regulations and control management by calculating carbon dioxide emission discharged in generating heat and electricity, respectively, in a steam turbine CHP plant.

Further, it is possible to easily apply and use a method of calculating carbon dioxide emission according to the present invention for a substantial steam turbine CHP plant, by providing a system for performing the method of calculating carbon dioxide emission described above.

DETAILED DESCRIPTION OF THE INVENTION

Hereinafter, preferred embodiments of the present invention will be described in detail with reference to the accompanying drawings, but the present invention is not limited to the following embodiments and can be modified in various ways by those skilled in the art, without departing from the spirit of the present invention.

Hereinafter, a method of calculating carbon dioxide emission of a steam turbine CHP pant according to a preferred embodiment of the present invention and a system for the method are described in detail.

Method of Calculating Carbon Dioxide Emission of Steam Turbine CHP Plant

Figure 1:
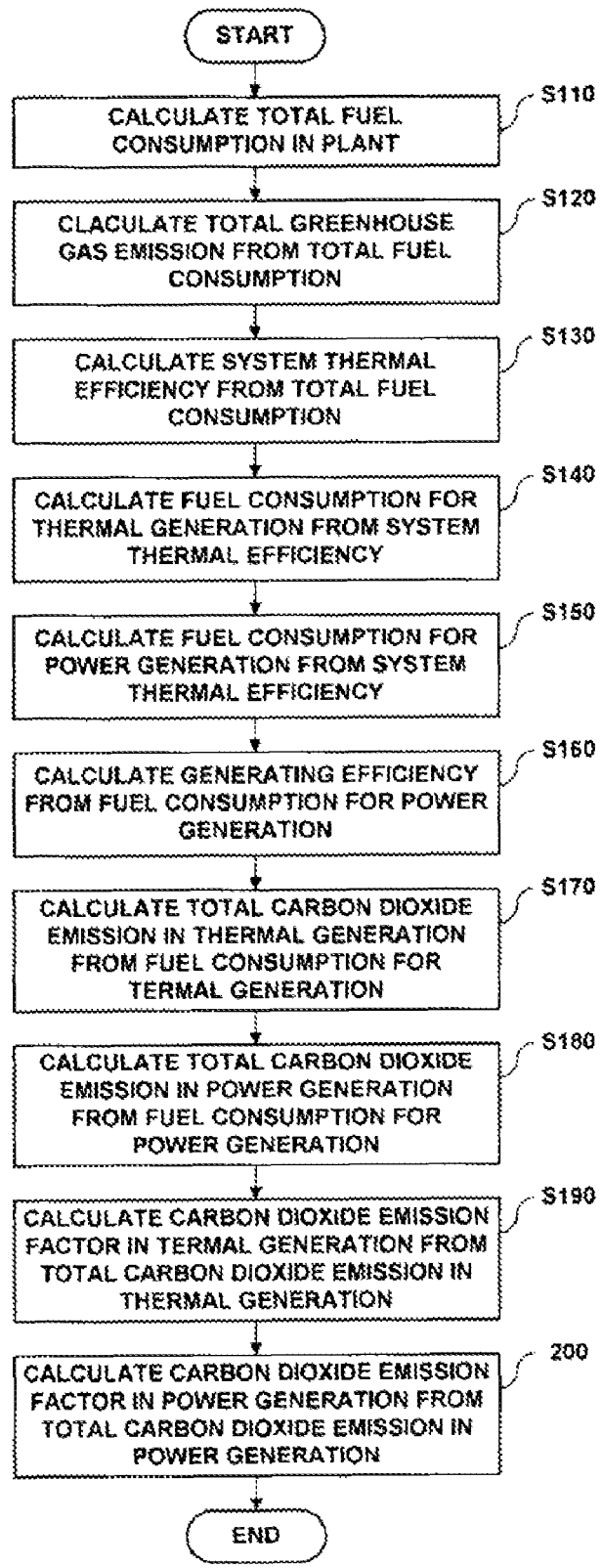
FIG. 1 is a flowchart illustrating a method of calculating carbon dioxide emission of a steam turbine CHP plant according to an embodiment of the present invention.

FIG. 1 is a flowchart illustrating a method of calculating carbon dioxide emission of a steam turbine CHP plant according to an embodiment of the present invention.

Referring to FIG. 1, the total fuel consumption of a plant is calculated (S110). As an embodiment, the total fuel consumption of the plant is obtained by adding up an input fuel amount, a heat amount received from the outside, and a power amount received from the outside.

The total greenhouse gas emission is calculated from the total fuel consumption (S120). As an embodiment, the total greenhouse gas emission is obtained by multiplying the total fuel consumption by an emission factor according to the type of fuel.

System thermal efficiency is calculated from the total fuel consumption (S130). As an embodiment, the system thermal efficiency is obtained by dividing a value, which is obtained by subtracting a heat amount consumed in the plant and a power amount consumed in the plant from the total generated heat amount, by the total fuel consumption.

Fuel consumption for thermal generation is calculated from the system thermal efficiency (S140). As an embodiment, the fuel consumption for thermal generation is obtained by dividing a sold heat amount by the system thermal efficiency.

Fuel consumption for power generation is calculated from the system thermal efficiency (S150). As an embodiment, the fuel consumption for power generation is obtained by dividing a value, which is obtained by subtracting a power amount consumed in the plant from the sum of a heat amount consumed in a turbine and a heat amount consumed in a condenser, by the system thermal efficiency.

Power generation efficiency is calculated from the fuel consumption for power generation (S160). As an embodiment, the power generation efficiency is obtained by dividing a sold power amount by the fuel consumption for power generation.

The total carbon dioxide emission in thermal generation is calculated from the fuel consumption for thermal generation (S170). As an embodiment, the total carbon dioxide emission in thermal generation is obtained by multiplying the fuel consumption for thermal generation by a carbon dioxide emission factor according to the type of fuel.

The total carbon dioxide emission in power generation is calculated from the fuel consumption for power generation (S180). As an embodiment, the total carbon dioxide emission in power generation is obtained by multiplying the fuel consumption for power generation by a carbon dioxide emission factor according to the type of fuel.

A carbon dioxide emission factor in thermal generation is calculated from the total carbon dioxide emission in thermal generation (S190). As an embodiment, the carbon dioxide emission factor in thermal generation is obtained by dividing the total carbon dioxide emission in thermal generation by a sold heat amount.

A carbon dioxide emission factor in power generation is calculated from the total carbon dioxide emission in power generation (S200). As an embodiment, the carbon dioxide emission factor in power generation is obtained by dividing the total carbon dioxide emission in power generation by a sold power amount.

Figure 2:
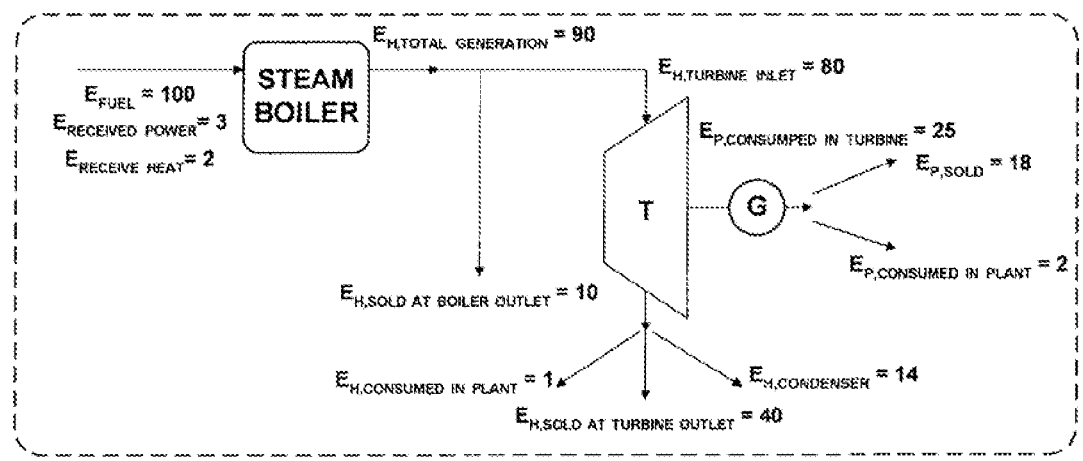
FIG. 2 is a flowchart illustrating a substantial calculation process according to a method of calculating carbon dioxide emission according to an embodiment of the present invention.

FIG. 2 is a flowchart illustrating a substantial calculation process according to a method of calculating carbon dioxide emission according to an embodiment of the present invention.

Referring to FIG. 2, "STEAM BOILER" designates a steam boiler, "T" designates a turbine, and "G" designates a generator.

The total fuel consumption of a plant is obtained as follows:

$$\text{total fuel consumption} = E_{fuel} + E_{received\ heat} + E_{received\ power}$$
$$= 100 + 3 + 2$$
$$= 105\ (\text{Gcal}),$$

where $E_{fuel}$ is a fuel amount inputted in the plant, $E_{received\ heat}$ is a heat amount received from the outside, and $E_{received\ power}$ is a power amount received from the outside.

The total greenhouse gas emission is obtained as follows:

$$\text{total greenhouse gas emission} = (E_{fuel} + E_{received\ heat} + E_{received\ power}) \times$$
$$\text{emission factor}_{CO2, fuel\ type}$$
$$= (100 + 3 + 2) \times 307 \text{ (kg/Gcal)}$$
$$= 32235 \text{ (kg)},$$

where emission factor$_{CO2, fuel}$ is a carbon dioxide emission factor according to the type of fuel.

System thermal efficiency $e_H$ implies steam generation efficiency and is obtained as follows:

$$e_H = (E_{H,total\ generation} - E_{H,consumed\ in\ plant} - E_{P,consumed\ in\ plant})/$$
$$(E_{fuel} + E_{received\ heat} + E_{received\ power})$$
$$= (90 - 1 - 2)/(100 + 2 + 3)$$
$$= 82.9\%,$$

where $E_{H,\ total\ generation}$ is total heat energy generated in a plant, $E_{H,\ consumed\ in\ plant}$ is a heat amount consumed in a plant, and $E_{P,\ consumed\ in\ plant}$ is a power amount consumed in a plant.

Fuel consumption for thermal generation $E_{F,H}$ is obtained as follows:

since the fuel consumption for thermal generation is equal to a sold heat amount, $$E_{F,H} = E_{H,sold}/e_H$$
$$= (10 + 40)/0.829$$
$$= 60 \text{ (Gcal)},$$

where $E_{H,sold}$ is a heat amount sold to consumers at the outside, which is the sum of a boiler outlet-sold heat amount of steam $E_{H,\ sold\ at\ boiler\ outlet}$ which is generated by a boiler and directly sold without through a turbine and a turbine outlet-sold heat amount $E_{H,\ sold\ at\ turbine\ outlet}$ which is discharged through the turbine and sold to consumers. That is, $$E_{H,sold} = E_{H,sold\ at\ boiler\ outlet} + E_{H,sold\ at\ turbine\ outlet}$$

*Fuel consumption $E_{F,P}$ for power generation is obtained as follows:

$$E_{F,P} = (E_{H,consumed\ in\ turbine} + E_{H,condenser} - E_{P,consumed\ in\ plant})/e_H$$
$$= (25 + 14 - 2)/0.829$$
$$= 45 \text{ (Gcal)},$$

where $E_{H,\ consumed\ in\ turbine}$ is a heat amount consumed in the turbine, $E_{H,\ condenser}$ is a heat amount consumed in the condenser, and $E_{P,\ consumed\ in\ plant}$ is a power amount consumed in a plant. The heat amount consumed in the turbine is the sum of the heat amount of steam that is reduced after performing a work for power generation while expanding in the turbine and the enthalpy that is reduced by turbine efficiency. The reason of excepting the power amount consumed in the plant when obtaining the fuel consumption for power generation is for avoiding duplication, because it was already included in the calculation of the system thermal efficiency. This is because there is a problem in that the power amount that is consumed in the plant is included twice when heat (steam) is generated and electricity (power) is generated, if it is not considered.

Power generation efficiency $e_P$ is obtained as follows:

$$e_P = E_{P,sold}/E_{F,P}$$
$$= 18/45$$
$$= 40(\%),$$

where $E_{P,sold}$ is a power amount sold to consumers at the outside.

The total carbon dioxide emission in thermal generation (total emission$_{heat}$) is obtained as follows:

$$\text{total emission}_{heat} = E_{F,H} \times \text{emission factor}_{CO2, fuel\ type}$$
$$= 60 \times 307 \text{ (kg/Gcal)}$$
$$= 18420 \text{ (kg)},$$

where emission factor$_{CO2,\ fuel}$ is a carbon dioxide emission factor according to the type of fuel.

The total carbon dioxide emission in electricity generation (power generation) (total emission$_{electricity}$) is obtained as follows:

$$\text{total emission}_{electricity} = E_{F,H} \times \text{emission factor}_{CO2, fuel\ type}$$
$$= 45 \times 307 \text{ (kg/Gcal)}$$
$$= 13815 \text{ (kg)}.$$

A carbon dioxide emission factor according to thermal generation (emission factor$_{heat}$) is obtained as follows:

$$\text{emission factor}_{heat} = \text{total emission}_{heat}/E_{H,sold}$$
$$= 18420/50$$
$$= 368 \text{ (kg/Gcal)}$$
$$= 316 \text{ (kg/MWh)}.$$

A carbon dioxide emission factor according to electricity generation (emission factor$_{electricity}$) is obtained as follows:

$$\text{emission factor}_{heat} = \text{total emission}_{electricity}/E_{H,sold}$$
$$= 13815/18$$
$$= 768 \text{ (kg/Gcal)}$$
$$= 660 \text{ (kg/MWh)}.$$

System for Calculating Carbon Dioxide Emission of Steam Turbine CHP Plant

Figure 3:
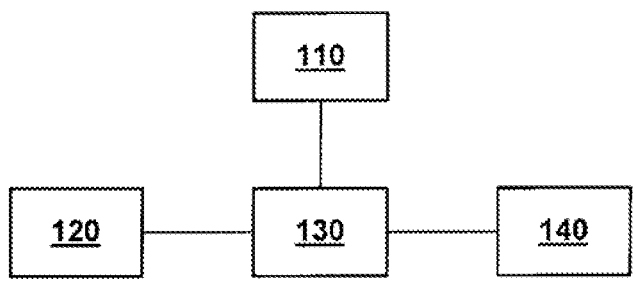
FIG. 3 is a block diagram illustrating a system for calculating carbon dioxide emission of a steam turbine CHP plant according to an embodiment of the present invention.

FIG. 3 is a block diagram illustrating a system for calculating carbon dioxide emission of a steam turbine CHP plant according to an embodiment of the present invention.

Referring to FIG. 3, a system for calculating carbon dioxide emission of a steam turbine CHP plant includes a data collecting unit 110, a variable inputting unit 120, an emission calculating unit 130, and a display unit 140.

The data collecting unit 110 collects data for calculating carbon dioxide emission. That is, data required for calculating carbon dioxide emission is collected by measuring devices or sensing devices at each site in the plant. As an embodiment, the data may be an input fuel amount, a heat amount received from the outside, a power amount received from the outside, the total generated heat amount, a heat amount consumed in the plant, a power amount consumed in the plant, a sold heat amount, a heat amount consumed in the turbine, a heat amount consumed in the condenser, and a sold power amount.

The variable inputting unit 120 receives variables required for calculating carbon dioxide emission. As an embodiment, the variable may be a carbon dioxide emission factor according to the type of fuel that is used in the plant.

The emission calculating unit 130 calculates carbon dioxide emission on the basis of the data collected by the data collecting unit 110 and the variables inputted from the variable inputting unit 120. As an embodiment, the emission calculating unit 130 can calculate carbon dioxide emission on the basis of the method of calculating carbon dioxide emission described above, and repeat descriptions for the same parts are not provided.

The display unit 140 displays the result calculated by the emission calculating unit 130. As an embodiment, the display unit 140 may be a computer monitor, a liquid crystal display (LCD), and a printer, etc.

What is claimed is:

1. A method of calculating carbon dioxide emission of a steam turbine CHP plant, the method comprising:
   calculating the total fuel consumption of the plant;
   calculating the total greenhouse gas emission from the total fuel consumption;
   calculating system thermal efficiency from the total fuel consumption;
   calculating fuel consumption for thermal generation from the system thermal efficiency;
   calculating fuel consumption for power generation from the system thermal efficiency;
   calculating power generation efficiency from the fuel consumption for power generation;
   calculating the total carbon dioxide emission in thermal generation from the fuel consumption for thermal generation; and
   calculating the total carbon dioxide emission in power generation from the fuel consumption for power generation,
   wherein at least one calculating operation of the method of calculating carbon dioxide emission of a steam turbine CHP plant is executed by a calculating unit.

2. The method of calculating carbon dioxide emission of a steam turbine CHP plant according to claim 1, wherein the calculating of the total fuel consumption of the plant is performed by adding up an input fuel amount, a heat amount received from the outside, and a power amount received from the outside.

3. The method of calculating carbon dioxide emission of a steam turbine CHP plant according to claim 1, wherein the calculating of the total greenhouse emission from the total fuel consumption is performed by multiplying the total fuel consumption by an emission factor according to the type of fuel.

4. The method of calculating carbon dioxide emission of a steam turbine CHP plant according to claim 1, wherein the calculating of system thermal efficiency from the total fuel consumption is performed by dividing a value, which is obtained by subtracting a heat amount consumed in the plant and a power amount consumed in the plant from the total generated heat amount, by the total fuel consumption.

5. The method of calculating carbon dioxide emission of a steam turbine CHP plant according to claim 1, wherein the calculating of fuel consumption for thermal generation from the system thermal efficiency is performed by dividing a sold heat amount by the system thermal efficiency.

6. The method of calculating carbon dioxide emission of a steam turbine CHP plant according to claim 1, wherein the calculating of fuel consumption for power generation from the system thermal efficiency is performed by dividing a value, which is obtained by subtracting a power amount consumed in the plant from the sum of a heat amount consumed in a turbine and a heat amount consumed in a condenser, by the system thermal efficiency.

7. The method of calculating carbon dioxide emission of a steam turbine CHP plant according to claim 1, wherein the calculating of power generation efficiency from the fuel consumption for power generation is performed by dividing a sold power amount by the fuel consumption for power generation.

8. The method of calculating carbon dioxide emission of a steam turbine CHP plant according to claim 1, wherein the calculating of the total carbon dioxide emission in thermal generation from fuel consumption for thermal generation is performed by multiplying the fuel consumption for thermal generation by a carbon dioxide emission factor according to the type of fuel.

9. The method of calculating carbon dioxide emission of a steam turbine CHP plant according to claim 1, wherein the calculating of the total carbon dioxide emission in power generation from fuel consumption for power generation is performed by multiplying the fuel consumption for power generation by a carbon dioxide emission factor according to the type of fuel.

10. The method of calculating carbon dioxide emission of a steam turbine CHP plant according to claim 1, further comprising:
    calculating a carbon dioxide emission factor in thermal generation from the total carbon dioxide emission in thermal generation; and
    calculating a carbon dioxide emission factor in power generation from the total carbon dioxide emission in power generation.

11. The method of calculating carbon dioxide emission of a steam turbine CHP plant according to claim 10, wherein the calculating of a carbon dioxide emission factor in thermal generation from the total carbon dioxide emission in thermal generation is performed by dividing the total carbon dioxide emission in thermal generation by a sold heat amount.

12. The method of calculating carbon dioxide emission of a steam turbine CHP plant according to claim 10, wherein the calculating of a carbon dioxide emission factor in power generation from the total carbon dioxide emission in power generation is performed by dividing the total carbon dioxide emission in power generation by a sold power amount.

13. A system for calculating carbon dioxide emission of a steam turbine CHP plant; the system comprising:
    a data collecting unit that collects data for calculating carbon dioxide emission;
    a variable inputting unit that receives variables required for calculating carbon dioxide emission;

an emission calculating unit that calculates carbon dioxide emission on the basis of the data collected by the data collecting unit and the variables inputted from the variable inputting unit; and a display unit that displays the result calculated by the emission calculating unit.

14. The system for calculating carbon dioxide emission of a steam turbine CHP plant according to claim 13, wherein the data-collecting unit is configured to collect an input fuel amount, a heat amount received from the outside, a power amount received from the outside, the total generated heat amount, a heat amount consumed in the plant, a power amount consumed in the plant, a sold heat amount, a heat amount consumed in a turbine, a heat amount consumed in a condenser, and a sold power amount.

15. The system for calculating carbon dioxide emission of a steam turbine CHP plant according to claim 13, wherein the variable-inputting unit is configured to receive a carbon dioxide emission factor according to the type of fuel.

16. The system for calculating carbon dioxide emission of a steam turbine CHP plant according to claim 13, wherein the emission calculating unit is configured to:
- calculate the total fuel consumption of the plant;
- calculate the total greenhouse gas emission from the total fuel consumption;
- calculate system thermal efficiency from the total fuel consumption;
- calculate fuel consumption for thermal generation from the system thermal efficiency;
- calculate fuel consumption for power generation from the system thermal efficiency;
- calculate power generation efficiency from the fuel consumption for power generation;
- calculate the total carbon dioxide emission in thermal generation from the fuel consumption for thermal generation; and
- calculate the total carbon dioxide emission in power generation from the fuel consumption for power generation.

* * * * *